March 28, 1967
W. G. BOEHM
3,311,219
SHUTTLE CONVEYOR
Filed March 14, 1966
3 Sheets-Sheet 1
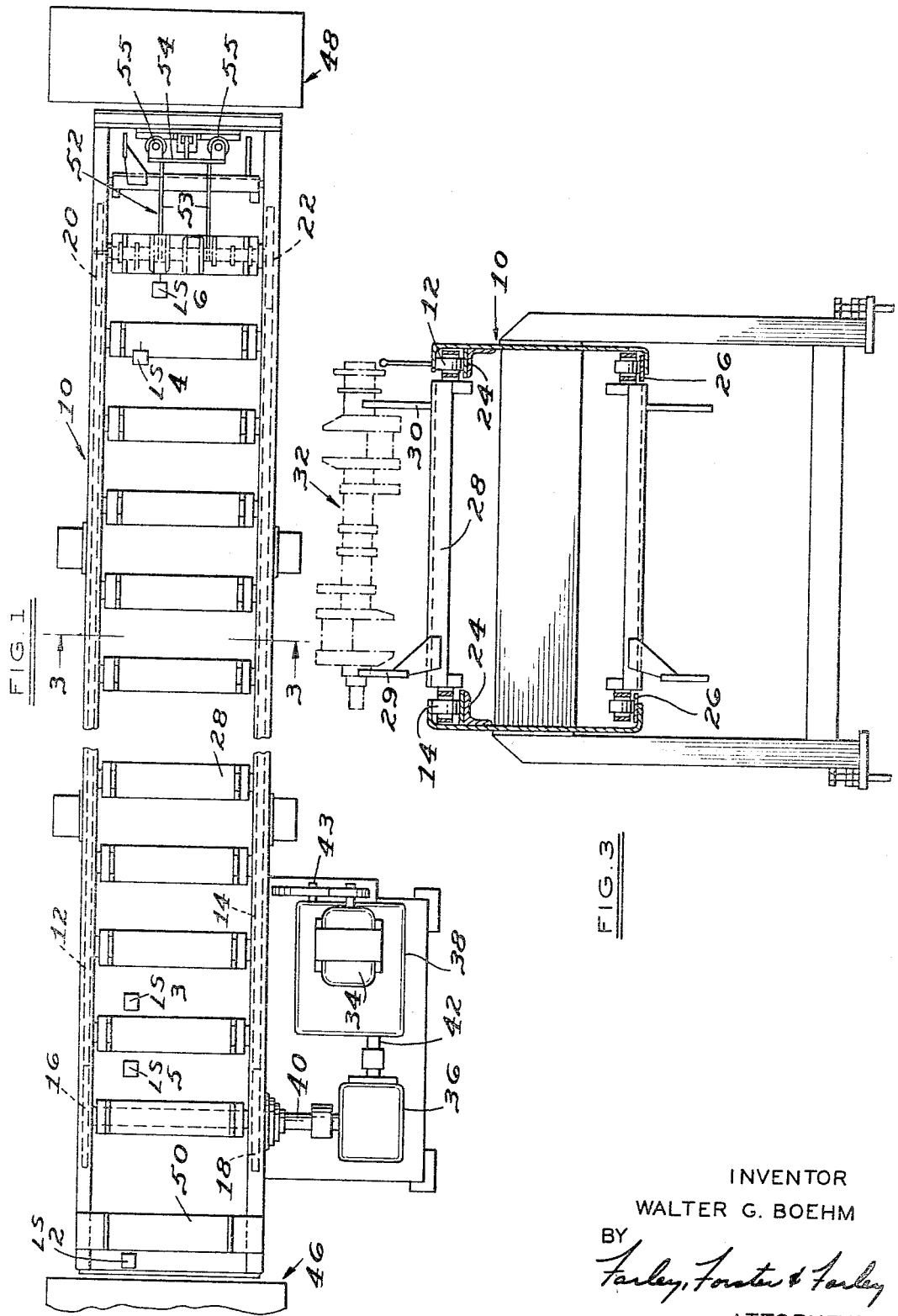
INVENTOR
WALTER G. BOEHM
BY
Farley, Forster & Farley
ATTORNEYS

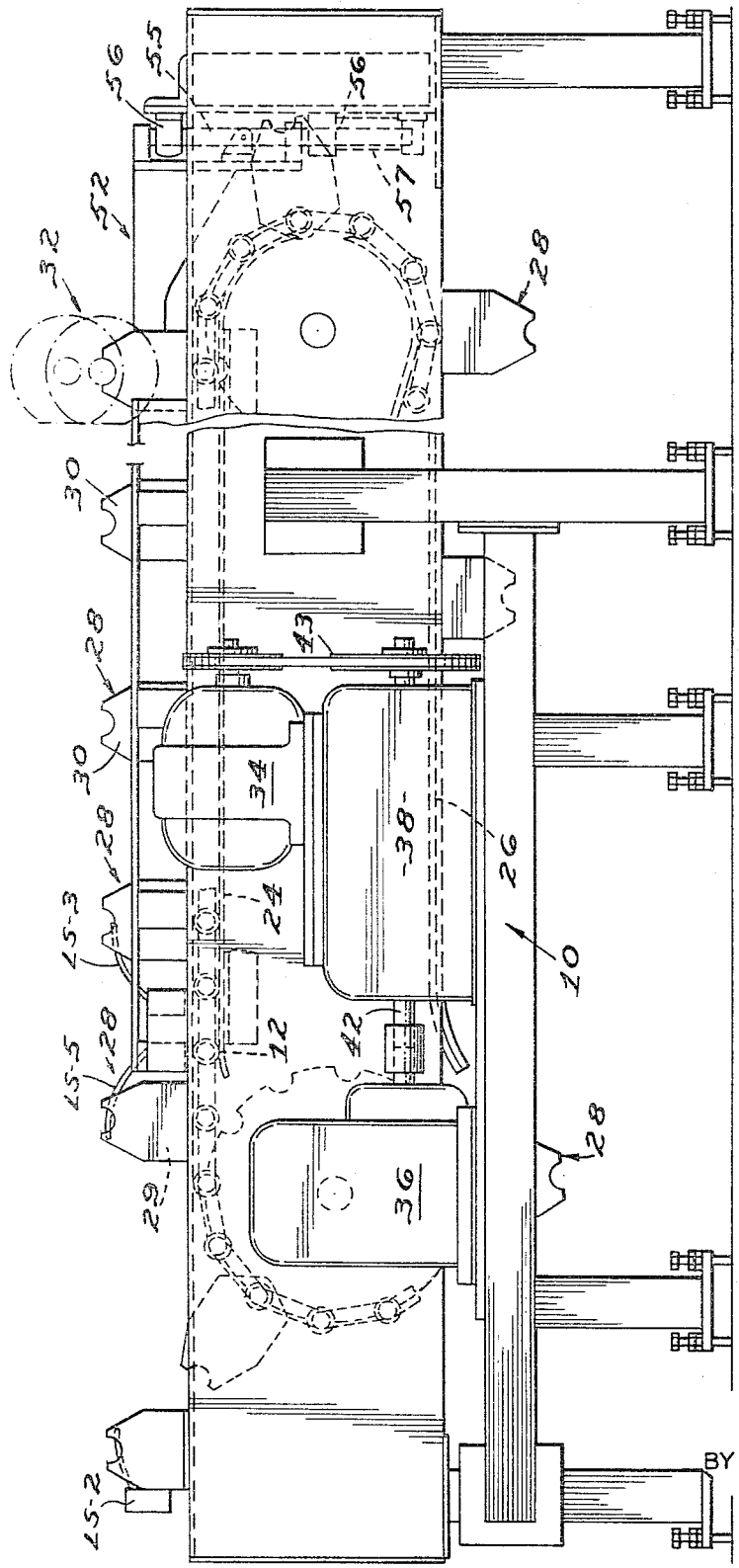

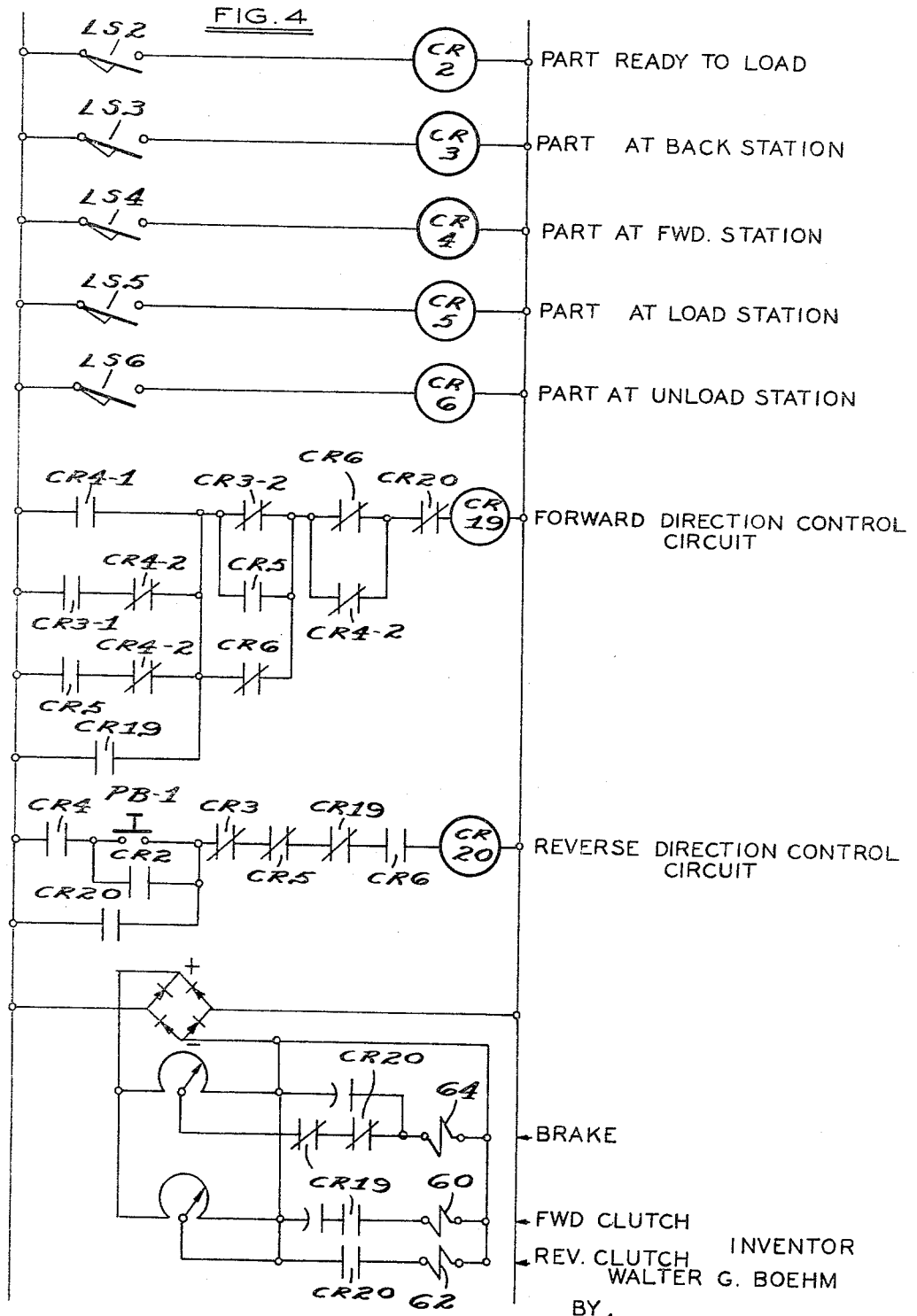

United States Patent Office 3,311,219
Patented Mar. 28, 1967

3,311,219
SHUTTLE CONVEYOR
Walter G. Boehm, Birmingham, Mich., assignor to Jervis B. Webb Company, a corporation of Michigan
Filed Mar. 14, 1966, Ser. No. 534,050
10 Claims. (Cl. 198—110)

This invention relates to improvements in a shuttle type conveyor used to deliver workpieces to a work station, or from one work station to a successive work station in a manufacturing or assembly process.

Due to the many variables which may change the production rate of an individual work station in a manufacturing or assembly process, it is desirable to accumulate a reserve bank of workpieces or parts in advance of the station. Accordingly, the overall objects of the present invention are to provide a shuttle type conveyor which will automatically: (a) build up and accumulate a desired number of workpieces in a bank in advance of a work station; (b) feed successive workpieces to the work station as called for; and (c) compensate for variations in the rates at which workpieces may be called for at the work station and at which workpieces may be delivered to the conveyor so as to maintain the desired number of workpieces in the bank and replenish the bank if the workpieces therein fall below the desired number.

The invention provides a shuttle conveyor having a plurality of workpiece supports, conveying means on which the workpiece supports are mounted in spaced relation, and reversible driving means operatively connected to the conveying means for moving the conveying means and workpiece supports in a forward direction from a loading station to an unloading station and in a reverse direction toward the loading station. Operation of the reversible driving means is regulated by sensing elements and associated controls so that when, with the conveyor empty, the first part is loaded thereon at the loading station, the conveyor is moved in the forward direction until the part is delivered to the unloading station; then, as long as the part remains in the unloading station the conveyor will move in the forward direction one step or workpiece support as each part is loaded on the conveyor at the loading station. If the part at the unloading station is removed during this process before all workpiece supports on the conveyor are filled, the conveyor will be moved in the forward direction until a new part is delivered to the unloading station; then, the conveyor will be driven in the reverse direction toward the loading station until the last part loaded is one step removed from the loading station. The operation of the conveyor will then proceed as above.

Thus, in the event parts are removed from the unloading station at a rate faster than parts are delivered to the loading station, the conveyor will automatically operate to supply this demand for parts at the unloading station as long as there are parts accumulated in the bank on the conveyor. When conditions are reversed, and parts are delivered to the conveyor at a rate faster than they are removed from the unloading station, the conveyor automatically operates to replenish the bank, in the event there are any empty workpiece supports, through the reversing or shuttle action described.

Other features and advantages of the construction will appear from the representative embodiment thereof shown in the accompanying drawings in which:

FIGURE 1 is a plan view of the basic conveyor construction;

FIGURE 2 is a side elevation of the structure shown in FIG. 1 on an enlarged scale;

FIGURE 3 is a sectional elevation of the structure shown in FIG. 2 taken as indicated by the line 3—3 of FIG. 1; and FIGURE 4 is a schematic circuit diagram showing the relation of the basic sensing and control elements.

The construction illustrated includes suitable frame structure, generally designated by the reference 10, for the conveying and driving means, which is of ordinary design and hence has not been shown and will not be described in detail. The conveying means consists of a pair of endless roller chains 12 and 14 trained about a pair of head sprockets 16 and 18 and a pair of tail sprockets 20 and 22, the chains 12 and 14 being supported and guided on upper tracks 24 and lower tracks 26 and carried by the frame structure 10 as best shown in FIG. 3.

A plurality of workpiece supports 28 are mounted between the conveyor chains 12 and 14 in equally spaced relation therealong, each workpiece support including some suitable means for mounting a workpiece thereon, such as the pair of cradles 29 and 30 for the internal combustion engine crankshaft 32 shown as a representative part or workpiece.

The head sprockets 16 and 18 and conveyor chains are driven by reversible driving means consisting of a motor 34 driving a suitable gear box or reducer 36 through a reversing transmission unit 38, the head sprockets 16 and 18 being secured to a shaft 40 driven from the output shaft of the reducer 36. The reversing transmission 38 has not been shown in detail since it is a commercially available type whose output shaft 42 can be selectively coupled to the input shaft 43 through either of a pair of electrically operable clutches combined with a single brake. When the driving means is operating, the motor 34 runs continuously in one direction driving the input shaft 43 of the reversing transmission. If neither clutch of the reversing transmission is energized, the output shaft 42 of the transmission is stationary and is held in position by the brake. When one of the transmission clutches is energized the output shaft 42 is driven in a forward direction; and, when the other transmission clutch is energized the output shaft is driven in a reverse direction. Control circuits for the transmission clutches and brake are shown in the schematic diagram FIG. 4 and will be later described.

FIG. 1 schematically illustrates the shuttle conveyor as being of indefinite length depending on the number of parts or workpieces desired to be handled by the conveyor, and extending between a station 46 to the left and a station 48.

Station 46 may be an automatic loading station, or a work station at which an operation is performed on a part, or combination work station and automatic loading station; but to simplify the present description no such apparatus has been shown and it may be assumed that parts are loaded manually onto the workpiece supports 28 of the shuttle conveyor with the optional inclusion of a fixed workpiece support 50 carried by the conveyor frame structure 10 adjacent the station 46. This fixed workpiece support 50 is equipped with a sensing element LS2 to detect the presence of a workpiece thereon ready to load onto the shuttle conveyor.

Operation of the reversible driving unit is regulated by control means which include the following sensing elements:

(a) A limit switch LS5 for detecting the presence of a workpiece on the first upright workpiece support 28 at the left side of the conveyor as viewed in FIGS. 1 and 2, which location will be referred to as the loading station;

(b) A limit switch LS3 suitably mounted on the conveyor frame structure 10 for detecting the presence of a workpiece on the workpiece support 28 immediately adjacent the loading station which station will be referred to as the back station;

(c) A limit switch LS6 for detecting the presence of a workpiece at the unloading station, which in the construction illustrated, is equipped with unloading mechanism 52 for lifting a workpiece off the last upright workpiece support at the right hand end of the conveyor as the parts are shown in FIGS. 1 and 2. This unloading mechanism consists in a pair of workpiece engaging and supporting arms 53 mounted on a frame 54 which includes a pair of vertical guide rods 55 sliding in stationary guides 56 and movable by a suitable fluid pressure actuating cylinder 57. The limit switch LS6 is responsive to the presence of a workpiece on the support arms 53, or in other words, this sensing element detects that a workpiece has been delivered by the conveyor to the unloading station and is present at that station; and (d) A limit switch LS4 suitably carried by the conveyor frame structure 10 to detect the presence of a workpiece on the workpiece support 28 immediately adjacent the unloading station, the location of LS4 being referred to as the forward station.

As shown in the diagram FIG. 4, each of the limit switch sensing elements LS2-6 operates a control relay of the same number CR2-6, and circuit means connect contacts operated by these control relays in a forward direction control circuit which includes a control relay CR19 for the forward clutch 60 of the reversible transmission 38, and in a reverse direction control circuit which includes a control relay CR20 for the reverse clutch 62 of the transmission. Normally closed contacts operated by both relays CR19 and 20 control the transmission brake 64.

The forward and reverse direction control circuits are each shown in de-energized condition, with contacts operated by the control relays CR2-6 shown in their normally open or normally closed position as indicated.

Operation of the shuttle conveyor, as regulated by these sensing elements and the forward and reverse direction control circuits, will be briefly summarized. Assuming the motor 34 of the drive unit is running, the forward direction control circuit is energized when:

(1) There is no part at the unload station (CR6 closed) and
   (a) there is a part at the load station (CR5 closed). If there are no other parts on the conveyor, the circuit remains energized until the part loaded is delivered to the unload station and CR6 opens; or
   (b) there is a part at the forward station (CR4-1 closed) which part is advanced to the unload station (CR6 opens); or
   (c) there are parts at the back station and the load station (CR3-1 and CR5 closed) and no part at the forward station (CR4-2 closed) in which case the first part on the conveyor is delivered to the unloading station (CR6 opens).

(2) There is a part at the unload station, no part at the forward station (CR6 open, CR4-2 closed), and there is a part at the load station (CR5 closed). In this case the part loaded will be advanced to the back station (CR3-2 opens), and this step-by-step operation will take place each time a new part is loaded until a part reaches the forward station (CR4-2 opens).

Energization of the reverse direction control circuit takes place when parts are at the unload station and the forward station (CR6 and CR4 closed), there are no parts at the back station and the load station (CR3 and CR5 closed) and there is a part ready to load (CR2 closed) or the push button PB1 is operated. This reverse movement of the conveyor stops and the reverse direction control circuit is de-energized when the last part of the conveyor reaches the back station (CR3 opens).

An analysis of the various conditions under which the forward and reverse direction control circuits are energized and de-energized shows that the overall operation of the conveyor as controlled by these circuits and the sensing elements associated therewith is such as to fulfill the demand for parts at the unloading station as long as there is a part in reserve on the conveyor. If the rate at which parts are called for at the unloading station exceeds the rate at which parts are loaded on the conveyor, the conveyor will function to meet this excess demand as long as there are parts accumulated in the bank on the conveyor, depleting the bank, and the conveyor will then operate to rebuild the bank during any time parts are supplied to the conveyor at a rate greater than called for.

FIG. 4 and the foregoing description of the operation of the conveyor has been confined to a representative basic combination of sensing elements and control circuits. Those skilled in the art will appreciate that such a basic arrangement can readily be expanded to automatically correlate the operation of the conveyor with the operation of automatic loading equipment at station 46, with the operation of the unloading mechanism 52, or with other types of unloading mechanism which might be employed at station 48 in accordance with the nature of the workpiece or parts being handler and the operations being performed.

Also variations in the construction of the conveyor and workpiece supports mounted thereon will obviously be required in adapting the invention to various parts, workpieces and operations.

Thus, while preferred embodiments have been described above in detail, it will be understood that numerous modifications might be resorted to without departing from the scope of the invention as defined in the following claims.

I claim:

1. A shuttle conveyor for accumulating a bank of workpieces and successively delivering workpieces to a work station comprising:
   a plurality of workpiece supports;
   conveying means on which the workpiece supports are mounted in spaced relation;
   reversible driving means aperatively connected to the conveying means for moving the conveying means and workpiece supports in a forward direction from a loading station to an unloading station, and in a reverse direction toward the loading station;
   control means including:
   (a) a loading station sensing element responsive to the presence of a workpiece on a workpiece support at the loading station,
   (b) an unloading station sensing element responsive to the presence of a workpiece at the unloading station,
   (c) a back station sensing element responsive to the presence of a workpiece on a workpiece support immediately adjacent the loading station,
   (d) a forward station sensing element responsive to the presence of a workpiece on a workpiece support immediately adjacent the unloading station;
   and means connecting the sensing elements and the driving means to cause movement of the conveying means in the forward direction in response to the absence of a workpiece at the unloading station sensing element (b) and the presence of a workpiece at one of the loading station sensing element (a), the back station sensing element (c), and the forward station sensing element (d) until the workpiece is present at the unloading station; and, movement of the conveying means in the reverse direction in response to the presence of a workpiece at the unloading station sensing element (b), the presence of a workpiece at the forward station sensing element (d), and the absence of a workpiece at the back station sensing element (c) until a workpiece is present at the back station sensing element (c).

2. A shuttle conveyor as claimed in claim 1 wherein the means connecting the sensing elements and the driving means causes stepwise forward movement of the conveying means in response to the presence of a workpiece at the unloading station sensing element (b), the absence of a workpiece at the forward station sensing element (d), and the presence of a workpiece at the loading station sensing element (a) until a workpiece is present at the forward sensing element (d).

3. A shuttle conveyor as claimed in claim 1 wherein the control means further includes a ready station sensing element (e) responsive to the presence of a workpiece in advance of the loading station in a ready-to-load position, and the means connecting the sensing elements and the driving means causes movement of the conveying means in the reverse direction in response to the presence of a workpiece at the ready station sensing element (e).

4. A shuttle conveyor as claimed in claim 1 further comprising workpiece unloading mechanism at the unloading station, said unloading station sensing element (b) being responsive to the presence of a workpiece on the unloading mechanism.

5. A shuttle conveyor as claimed in claim 1 wherein the control means includes an electric circuit controlling forward direction movement of the conveying means and an electric circuit controlling reverse direction movement thereof.

6. A shuttle conveyor as claimed in claim 5 wherein the forward direction control circuit includes a contact element controlled by the forward station sensing element (a) and a contact element controlled by the forward station sensing element (d) in series with each other, said contact elements being arranged so that the circuit will not be energized when a workpiece is present at the forward station sensing element (d) unless a workpiece is absent at the unloading station sensing element (b).

7. A shuttle conveyor as claimed in claim 5 wherein the forward direction control circuit includes contact elements controlled by the forward station sensing element (d) in series with each of contact elements controlled by the loading station sensing element (a) and back station sensing element (c) whereby the control circuit is not energized in the event a workpiece is present at the forward station sensing element (d) and present at one of the loading station sensing element (a) and back station sensing element (c).

8. A shuttle conveyor as claimed in claim 5 wherein the forward direction control circuit includes a holding contact element arranged to maintain the circuit energized in response to initial energization thereof by contact elements operable by one of sensing elements (a), (c) and (d) until de-energized by a contact element operated by one of sensing elements (b), (c) and (d).

9. A shuttle conveyor as claimed in claim 5 wherein the reverse direction control circuit includes contact elements arranged in series to energize the circuit in response to the presence of a workpiece at the forward station sensing element (d), the presence of a workpiece at the unloading station sensing element (b) and the absence of a workpiece at the loading station sensing element (a) and the back station sensing element (c).

10. A shuttle conveyor as claimed in claim 9 further including a sensing element responsive to the presence of a workpiece at a ready station adjacent the loading station and wherein the reverse direction control circuit includes a further contact element for energizing the reverse control circuit in response to the presence of a workpiece at said ready station.

References Cited by the Examiner
UNITED STATES PATENTS

| | | | |
|---|---|---|---|
| 1,609,802 | 12/1926 | Ekstrom | 198—24 |
| 3,225,893 | 21/1965 | Currie | 198—127 |

EVON C. BLUNK, *Primary Examiner.*

E. A. SROKA, *Assistant Examiner.*

UNITED STATES PATENT OFFICE
CERTIFICATE OF CORRECTION

Patent No. 3,311,219                                            March 28, 1967

Walter G. Boehm

It is hereby certified that error appears in the above numbered patent requiring correction and that the said Letters Patent should read as corrected below.

Column 4, line 21, for "handler" read -- handled --; line 38, for "aperatively" read -- operatively --; column 5, line 26, for "forward" read -- loading --.

Signed and sealed this 7th day of November 1967.

(SEAL)
Attest:

Edward M. Fletcher, Jr.                                         EDWARD J. BRENNER
Attesting Officer                                                    Commissioner of Patents